(12) United States Patent
Johnson, Sr. et al.

(10) Patent No.: US 8,376,438 B1
(45) Date of Patent: Feb. 19, 2013

(54) PICKUP BED TOOL TRAY APPARATUS

(76) Inventors: Juan M. Johnson, Sr., Durham, NC (US); James A. Hill, Durham, NC (US)

( * ) Notice: Subject to any disclaimer, the term of this patent is extended or adjusted under 35 U.S.C. 154(b) by 0 days.

(21) Appl. No.: 13/227,763

(22) Filed: Sep. 8, 2011

(51) Int. Cl.
*B60R 9/06* (2006.01)
(52) U.S. Cl. ........................................ 296/37.6; 224/403
(58) Field of Classification Search .................. 296/37.6, 296/26.09; 224/402, 403, 281
See application file for complete search history.

(56) References Cited

U.S. PATENT DOCUMENTS

| | | |
|---|---|---|
| 4,522,326 A | 6/1985 | Tuohy, III |
| 5,088,636 A | 2/1992 | Barajas |
| 5,121,959 A | 6/1992 | King |
| 6,116,673 A | 9/2000 | Clonan |
| D534,856 S | 1/2007 | Herrera et al. |
| 7,992,912 B2 * | 8/2011 | Klotz et al. ............ 296/26.09 |

* cited by examiner

*Primary Examiner* — Dennis Pedder

(57) ABSTRACT

The pickup bed tool tray apparatus provides a movable, motorized tray that fits between the inner sides of a pickup bed, just below the bed top. The apparatus is therefore not in the way of storing or carrying anything in the bed. By using the control, the tray may be moved fore and aft, as needed, to best access tools and other equipment that may be carried in the tray.

8 Claims, 5 Drawing Sheets

PICKUP BED TOOL TRAY APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of tool box for a truck bed are known in the prior art. However, what is needed is rail-mounted tool box for a truck bed.

FIELD OF THE INVENTION

The pickup bed tool tray apparatus relates to tool holding devices and more especially to a rolling tray apparatus fitted within the bed of a pickup.

SUMMARY OF THE INVENTION

The general purpose of the pickup bed tool tray apparatus, described subsequently in greater detail, is to provide a pickup bed tool tray apparatus which has many novel features that result in an improved pickup bed tool tray apparatus which is not anticipated, rendered obvious, suggested, or even implied by prior art, either alone or in combination thereof.

To attain this, the pickup bed tool tray apparatus provides a movable, motorized tray that fits between the inner sides of a pickup bed, just below the bed top. The apparatus is therefore not in the way of storing or carrying anything in the bed. By using the control, the tray may be moved fore and aft, as needed, to best access tools and other equipment that may be carried in the tray. The apparatus may derive power from the existing pickup. The apparatus may also be battery powered. Importantly, the belt provides the link between the pulleys so that any problem within the tracks sees the belt slip prior to any track, caster, or motor failure. A more basic design of the apparatus may be installed without the track anchor as reinforcement.

Thus has been broadly outlined the more important features of the improved pickup bed tool tray apparatus so that the detailed description thereof that follows may be better understood and in order that the present contribution to the art may be better appreciated.

An object of the pickup bed tool tray apparatus is to provide for tool storage in a pickup bed.

Another object of the pickup bed tool tray apparatus is to provide movable tool storage.

A further object of the pickup bed tool tray apparatus is to provide motorized movable tool storage.

An added object of the pickup bed tool tray apparatus is to elevate tool storage above the pickup bed.

And, an object of the pickup bed tool tray apparatus is to save pickup bed space for uses other than tool storage.

These together with additional objects, features and advantages of the improved pickup bed tool tray apparatus will be readily apparent to those of ordinary skill in the art upon reading the following detailed description of presently preferred, but nonetheless illustrative, embodiments of the improved pickup bed tool tray apparatus when taken in conjunction with the accompanying drawings.

DETAILED DESCRIPTION OF THE DRAWINGS

With reference now to the drawings, and in particular FIGS. 1 through 5 thereof, the principles and concepts of the pickup bed tool tray apparatus generally designated by the reference number 10 will be described.

Figure 3:
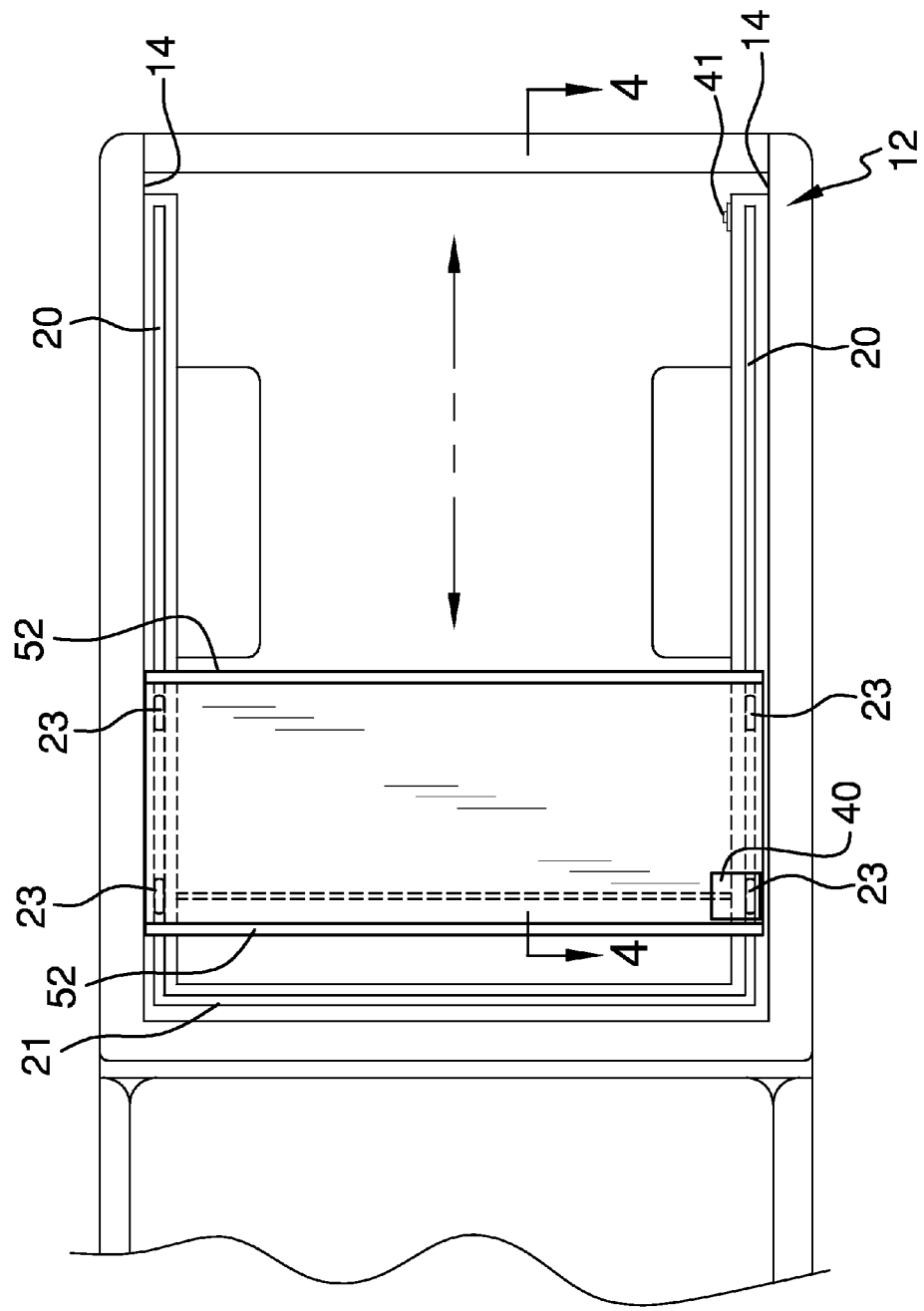
FIG. 3 is a top plan view, installed.

Referring to FIG. 3, the apparatus 10 partially comprises the pair of identical tracks 20. One of each track 20 is affixed within an existing pickup bed 12 on an inner side 14 of each side of the bed 12. The tracks 20 are affixed proximal to the top of the bed 12. The track anchor 21 is disposed forwardly within the bed 12. The track anchor 21 connects the tracks 20 and provides support within the bed 12 for the tracks 20.

Figure 1:
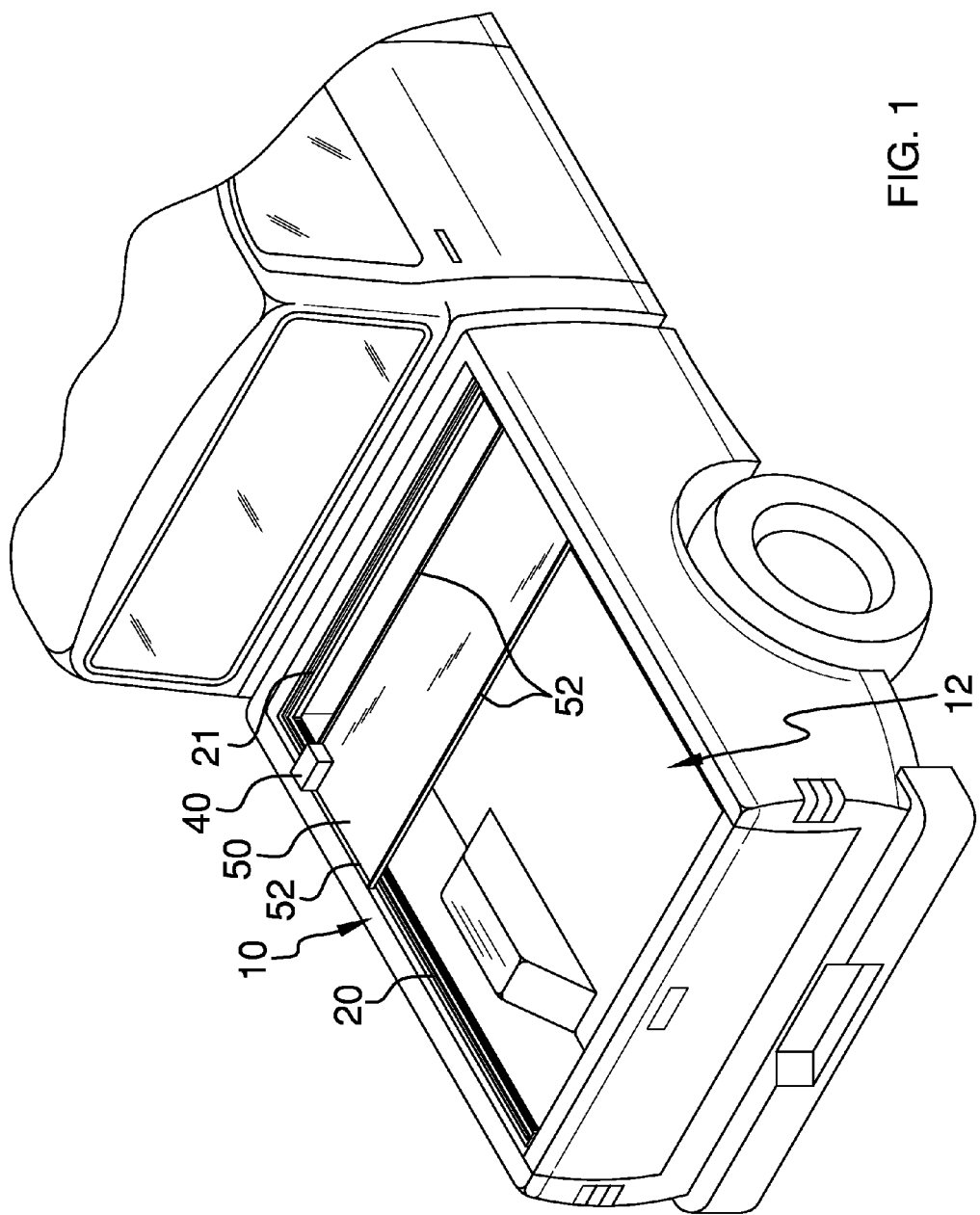
FIG. 1 is a perspective view of the apparatus installed.
Figure 4:
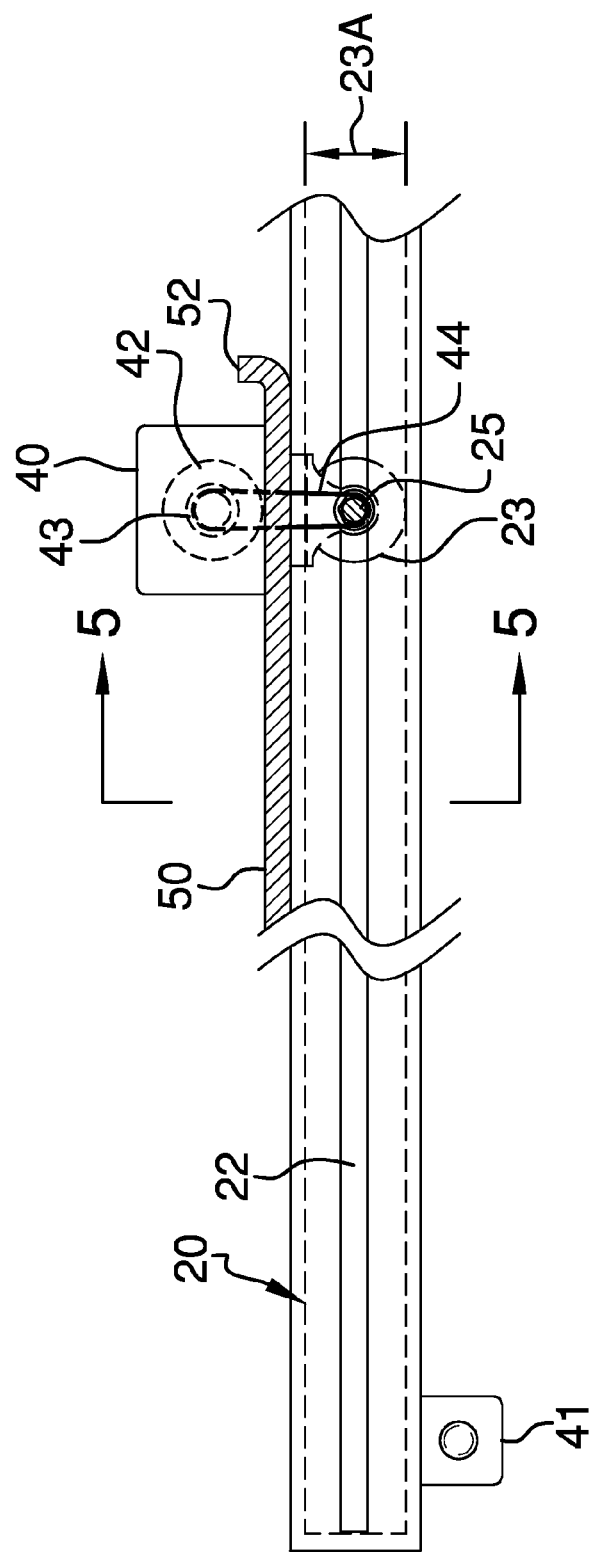
FIG. 4 is a partial cross sectional view of FIG. 3, taken along the line 4-4.

Referring to FIG. 4, the axle slot 22 is disposed centrally and horizontally within each track 20. Referring to FIG. 1, the tray 50 is disposed between and above the tracks 20. The tray 50 is disposed upwardly within the pickup bed 12 between the inner sides 14. The tray 50 further comprises a surrounding lip 52 to aid in object retention.

Figure 5:
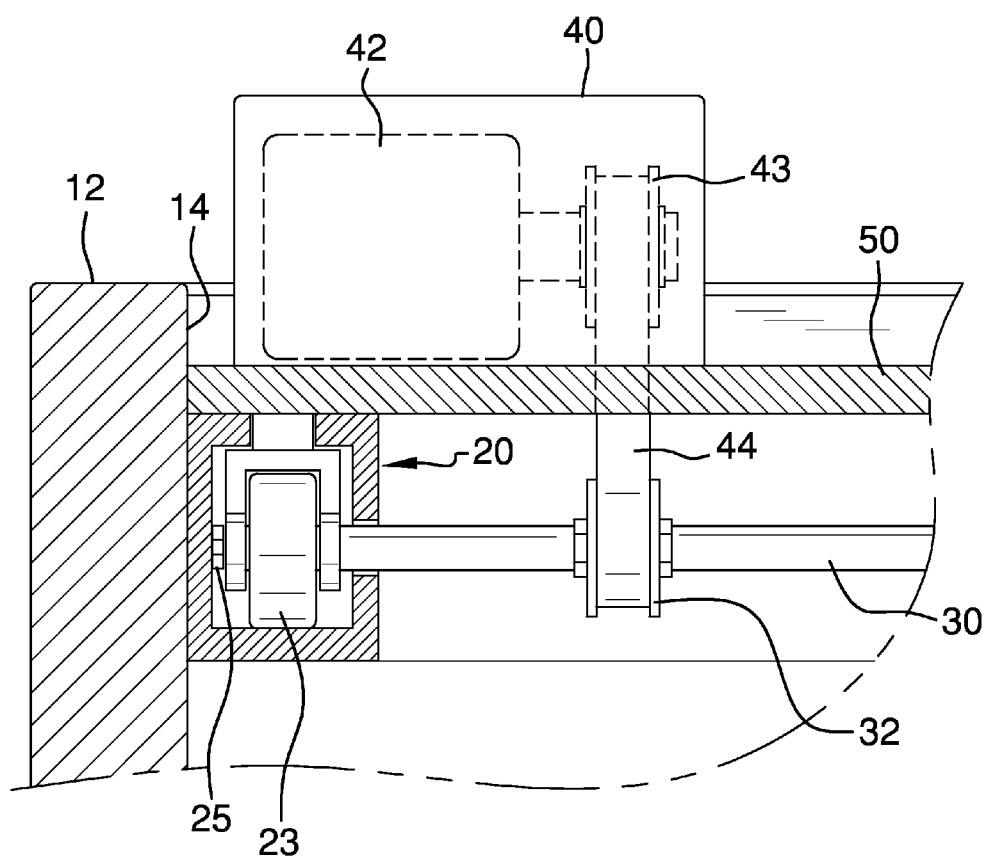
FIG. 5 is a partial cross sectional view of FIG. 4, taken along the line 5-5.

Referring to FIG. 5, the case 40 is disposed upon the tray 50. The motor 42 is disposed horizontally within the case 40.

Figure 2:
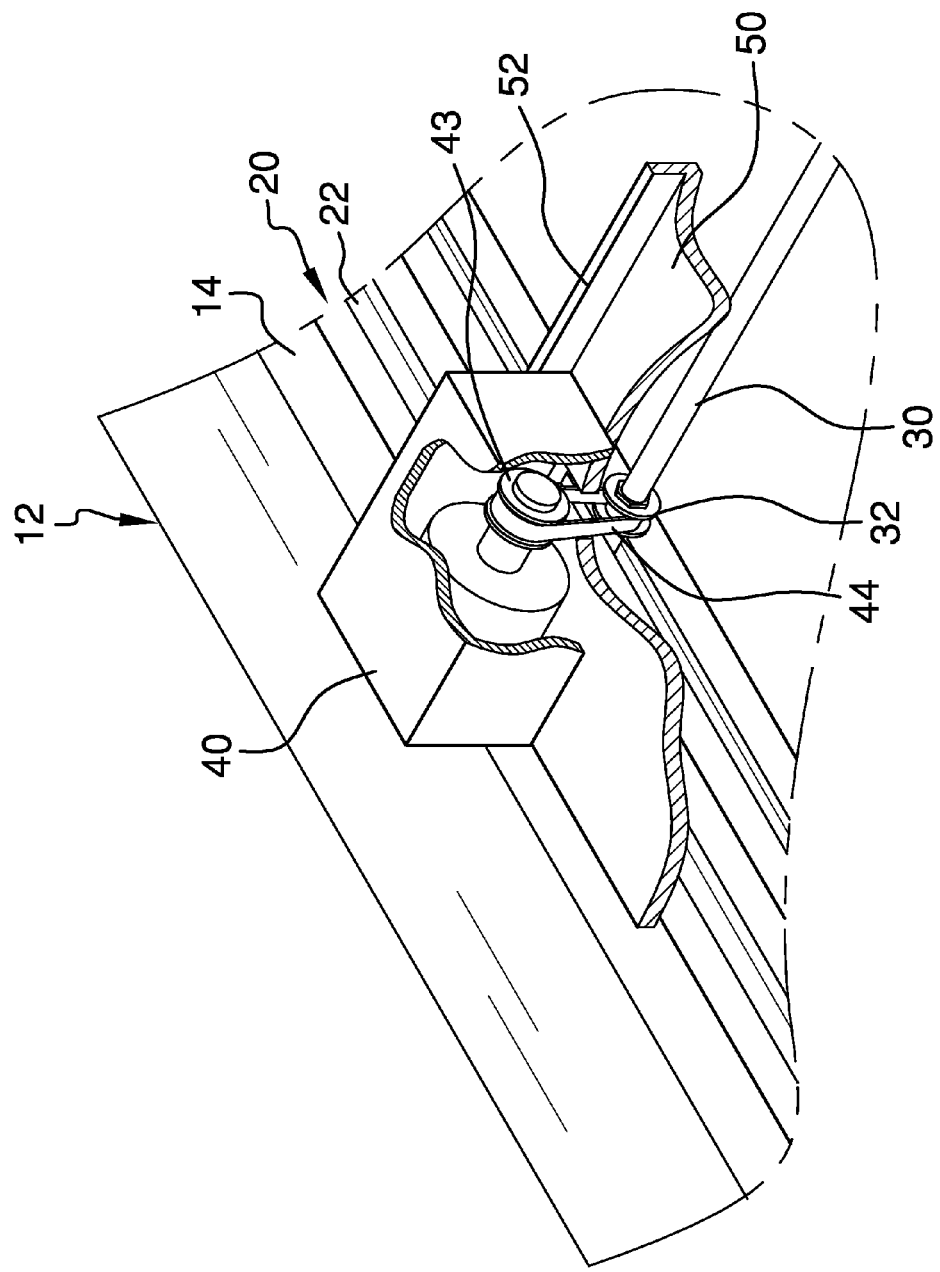
FIG. 2 is a partial cross sectional perspective view, illustrating motor, pulley, axle, and belt relationships.

Referring to FIG. 2, the motor pulley 43 is in direct communication with the motor 42.

Referring to FIGS. 3 and 5, the axle 30 is disposed horizontally across the pickup bed 12. The axle 30 is fitted within both track 20 axle slots 22. The axle 30 is disposed forwardly under the tray 50.

Referring to FIGS. 2 and 5, the axle pulley 32 is disposed on the axle 30. A caster 23 is disposed on each end of the axle 30. Each caster 23 is movably disposed in an opposite track 20. A retainer 25 removably retains each caster 23 on the axle 30. Each caster 23 preferably has a diameter 23A of about 2 inches, thereby ensuring smooth movement of the tray 50, without potential binding.

Referring again to FIG. 3, an additional pair of casters 23 is disposed rearwardly and downwardly on the tray 50. Each caster 23 is disposed within one of each of the tracks 20.

Referring again to FIG. 2, the belt connects the axle pulley 32 to the motor pulley 43.

Referring to FIG. 3 and FIG. 4, the control 41 controls the reversible motor 42. The motor 42 controls the tray 50 moving fore and aft within the pickup bed 12.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the pickup bed tool tray apparatus may be used.

What is claimed is:

1. A pickup bed tool tray apparatus comprising, in combination:
   a pair of identical tracks, one of each track affixed within an existing pickup bed on an inner side, proximal to a top of the bed;
   an axle slot disposed centrally and horizontally within each track;
   a tray disposed between and above the tracks, the tray disposed upwardly within the pickup bed;
   a case disposed upon the tray;
   a reversible motor disposed horizontally within the case;
   a motor pulley in direct communication with the motor;
   an axle disposed horizontally across the pickup bed, the axle fitted within both track axle slots;
   an axle pulley disposed on the axle;
   a caster disposed on an each end of the axle, each caster movably disposed in opposite tracks;
   a pair of casters disposed rearwardly and downwardly on the tray, each caster movably disposed in one of each of the tracks;
   a belt connecting the axle pulley to the motor pulley;
   a control controlling the motor;
   whereby the tray moves fore and aft within the pickup bed.

2. The apparatus according to claim 1 wherein each caster further comprises a diameter of about 2 inches.

3. The apparatus according to claim 1 wherein the tray further comprises a surrounding lip.

4. The apparatus according to claim 2 wherein the tray further comprises a surrounding lip.

5. A pickup bed tool tray apparatus comprising, in combination:
   a pair of identical tracks, one of each track affixed within an existing pickup bed on an inner side, proximal to a top of the bed;
   a track anchor disposed forwardly within the bed, the track anchor connecting the tracks;
   an axle slot disposed centrally and horizontally within each track;
   a tray disposed between and above the tracks, the tray disposed upwardly within the pickup bed;
   a case disposed upon the tray;
   a reversible motor disposed horizontally within the case;
   a motor pulley in direct communication with the motor;
   an axle disposed horizontally across the pickup bed, the axle fitted within both track axle slots;
   an axle pulley disposed on the axle;
   a caster disposed on an each end of the axle, each caster movably disposed in opposite tracks;
   a pair of casters disposed rearwardly and downwardly on the tray, each caster movably disposed in one of each of the tracks;
   a belt connecting the axle pulley to the motor pulley;
   a control controlling the motor;
   whereby the tray moves fore and aft within the pickup bed.

6. The apparatus according to claim 5 wherein each caster further comprises a diameter of about 2 inches.

7. The apparatus according to claim 5 wherein the tray further comprises a surrounding lip.

8. The apparatus according to claim 6 wherein the tray further comprises a surrounding lip.

* * * * *